(12) United States Patent
Volfson

(10) Patent No.: US 9,970,811 B2
(45) Date of Patent: May 15, 2018

(54) PASSIVE, WIDE-SPECTRAL-BAND LASER THREAT SENSOR

(71) Applicant: Leo Volfson, San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 255 days.

(21) Appl. No.: 14/015,620

(22) Filed: Aug. 30, 2013

(65) Prior Publication Data

US 2015/0060652 A1     Mar. 5, 2015

(51) Int. Cl.
*G01J 1/04*     (2006.01)
*G01J 1/02*     (2006.01)

(52) U.S. Cl.
CPC ........... *G01J 1/0425* (2013.01); *G01J 1/0266* (2013.01)

(58) Field of Classification Search
CPC ........... G01J 1/0425; G01J 1/04; G01B 11/00; G01B 11/30; G01D 5/26
USPC ........... 250/227.11, 216, 227.14, 239, 203.1, 250/203.2, 203.6; 385/9, 12, 15, 59, 60, 385/76, 77, 86, 89, 120, 115; 348/143, 348/144, 148, 152–155, 159; 356/3–22; 235/411–416
See application file for complete search history.

(56) References Cited

U.S. PATENT DOCUMENTS

| 4,568,183 A | * | 2/1986 | Douglas | G01J 5/00 356/239.8 |
| 4,625,108 A | * | 11/1986 | Nestel | G02B 6/04 250/226 |
| 6,439,751 B1 | * | 8/2002 | Jones | B60Q 1/00 362/470 |
| 8,229,304 B1 | * | 7/2012 | Pepper | H04B 10/61 398/162 |
| 2005/0122257 A1 | * | 6/2005 | Rowe | H01Q 3/08 342/179 |

* cited by examiner

*Primary Examiner* — Kevin Pyo
*Assistant Examiner* — Don Williams
(74) *Attorney, Agent, or Firm* — Fish & Richardson P.C.

(57) ABSTRACT

The present disclosure describes methods and systems for passive detection of wide-spectral-band laser emissions. One method includes receiving optical energy from an emission source at a surface of an object, transmitting the received optical energy through the surface using a detection patch coupled to the surface, the detection patch incorporating an exterior terminating end of each of one or more of a plurality of optical fibers embedded in a casting, transmitting the optical energy to a light sensor using a light pipe coupled to interior terminating ends of the one or more optical fibers, and analyzing, by operation of a computer, the optical energy received at the light sensor.

23 Claims, 13 Drawing Sheets

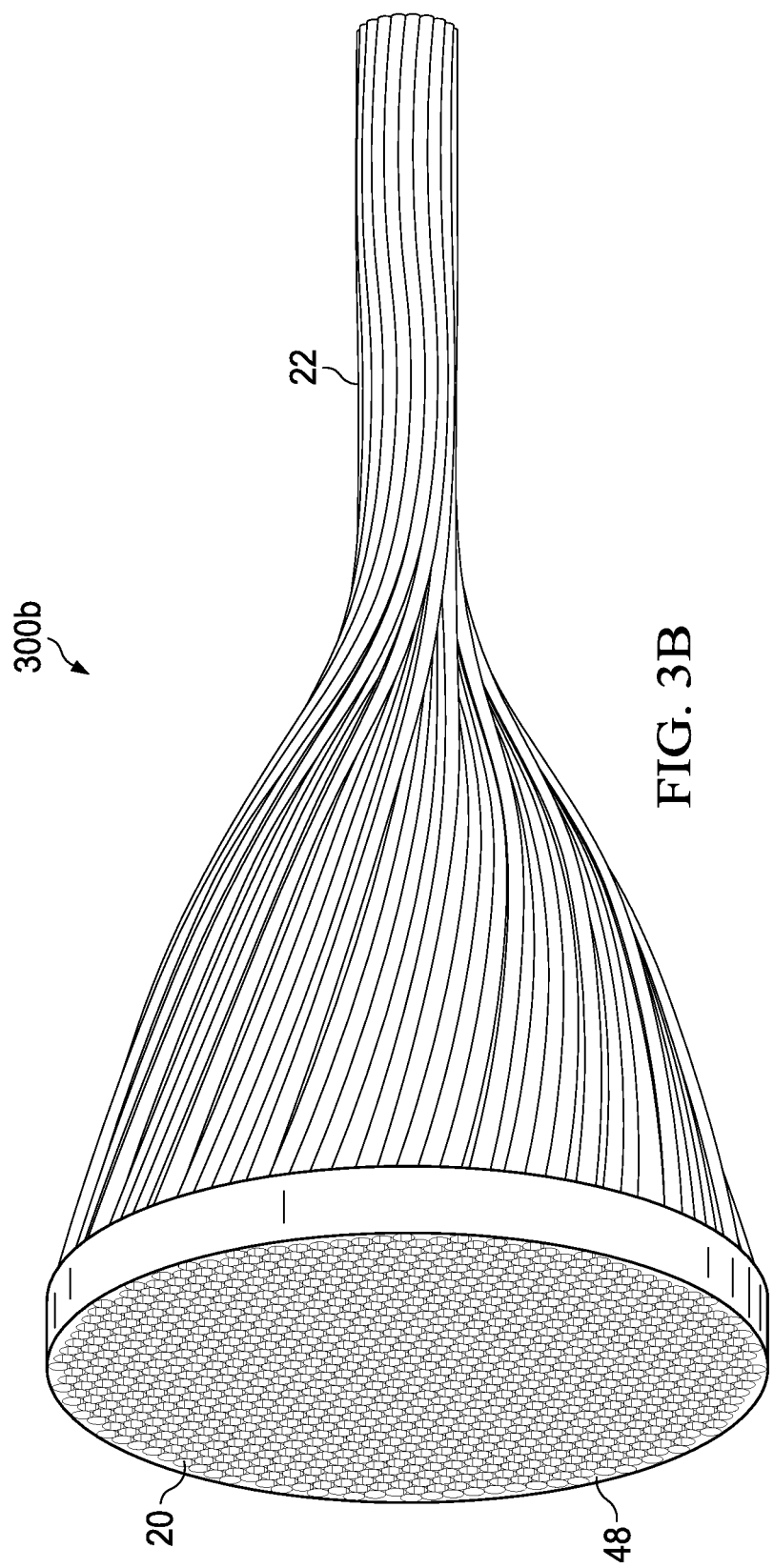

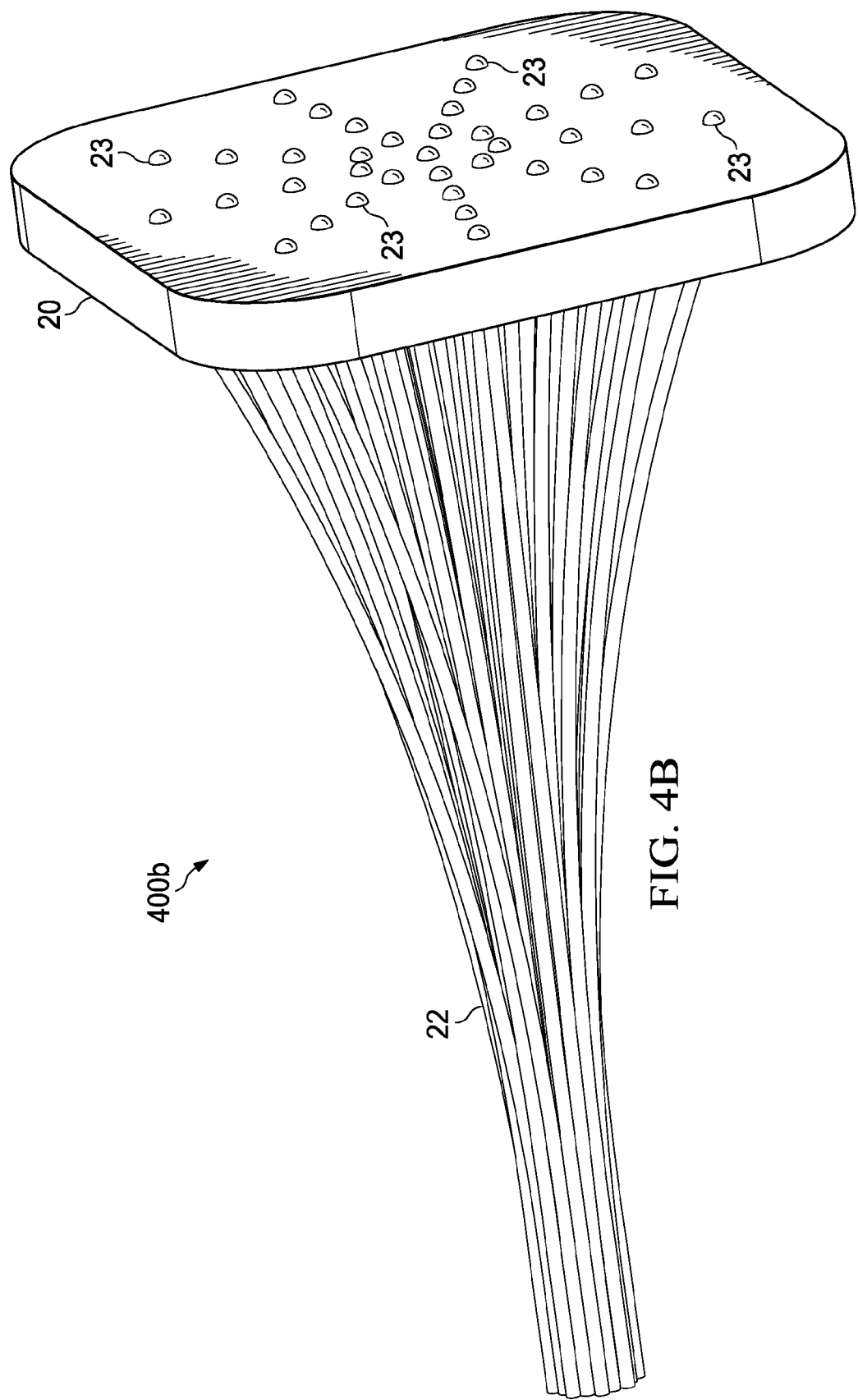

PASSIVE, WIDE-SPECTRAL-BAND LASER THREAT SENSOR

RELATED APPLICATIONS

This application is related to U.S. Pat. No. 6,439,751 B1 granted Aug. 27, 2002. The entire contents of U.S. Pat. No. 6,439,751 B1 are hereby incorporated by reference.

BACKGROUND

Passive detection of light sources, and in particular incoming optical energy, such as laser radiation, over a wide frequency range and at very high dynamic power levels, poses unique challenges for personnel and objects equipped with external surface detectors. Detection systems with external detectors often require the use of lenses and associated external lens-supporting structures, components and/or assemblies with which to receive and focus received optical energy from a light source upon one or more light detectors. Limitations of lenses include weight, optical clarity/transmissivity, reflectivity, and/or durability of lens materials and eventual damage to lenses over time by maintenance, cleaning, and/or abrasive environmental materials. Exterior lens-supporting structures, components, and/or assemblies can also increase the thickness of an object, reflect light, create a non-uniform surface (e.g., radar/optical reflecting), require maintenance, complicate fabrication, and/or introduce one or more structural weak points into a structure supporting a light source detector. Additionally, as multiple lens assemblies are needed to precisely calculate direction, range, and intensity of a light source, conventional light detection systems become prohibitively costly, introduce an unacceptable maintenance requirement, reduce operational readiness, and can only be used on objects with sufficient surface area to support the multiple lens assemblies.

SUMMARY

The present disclosure relates to methods and systems for passive detection of wide-spectral-band laser emissions sources. One method includes receiving optical energy from an emission source at a surface of an object, transmitting the received optical energy through the surface using a detection patch coupled to the surface, the detection patch incorporating an exterior terminating end of each of one or more of a plurality of optical fibers embedded in a casting, transmitting the optical energy to a light sensor using a light pipe coupled to interior terminating ends of the one or more optical fibers, and analyzing, by operation of a computer, the optical energy received at the light sensor Other implementations of this aspect include corresponding systems configured to perform the actions of the method. One or more systems can be configured to perform particular actions of the method. The systems can also include one or more computers configured to perform the particular operations or actions by virtue of having software, firmware, hardware, computer-readable media or a combination of software, firmware, hardware, or computer-readable media installed on the systems. One or more computer programs can be configured to perform particular operations or actions by virtue of including instructions that, when executed by a computer, cause the computer to perform the actions.

The foregoing and other implementations can each optionally include one or more of the following features, alone or in combination:

A first aspect, combinable with the general implementation, wherein the analysis is performed by a detector using light sensor data received from the light sensor.

A second aspect, combinable with any of the previous aspects, further comprising calculating, using optical energy analysis data, a true vector of the emission source in relation to the detection patch.

A third aspect, combinable with any of the previous aspects, further comprising initiating an action responsive to the received optical energy.

A fourth aspect, combinable with any of the previous aspects, further comprising filtering transmitted optical energy received from the light pipe before receipt by the light sensor.

A fifth aspect, combinable with any of the previous aspects, further comprising detecting a different optical energy frequency range or dynamic range, using two or more sections of the detection patch, each section used to detect a different optical energy frequency range or dynamic range.

The subject matter described in this specification can be implemented in particular implementations so as to realize one or more of the following advantages. First, a described passive sensor for incoming laser radiation operates over a wide frequency range and at very high dynamic power levels. Since the described sensor is passive, it is difficult, if not impossible, for a hostile party to detect and/or realize that the passive sensor is being used. Further, employing effective countermeasures against the passive sensor is also much more difficult than against active sensors. Second, many optical pathways, for example optical fibers, are embedded into the structural material outer "skin" of an object to form "detection patches." Many more optical fibers can be present in a given surface are and allow for reduced weight, durability, reliability, creative placement of the patches, and use on much smaller objects than typically allowed by traditional light detection assemblies (e.g., using lenses). The embedded optical fibers can transmit received wide-spectral-band laser emission source energy through the object's skin to one or more detectors. Third, the ends of the many optical fibers can be polished after manufacturing to be flush with the skin of the object in order to provide a smooth, uniform, continuous surface with lower overall reflectivity and decreased thickness. Fourth, the embedded optical fibers can be aimed at different angles to normal for the detection patch at that location. The known number of optical fibers, received light intensity/frequency, as well as the known optical fiber(s) angle(s) in relation to the surface skin of the object, will, for example, permit the system to determine one or more of laser emission source angle, range, and type. Fifth, the optically conductive optical fibers go through the outer skin of the structural material and form a solid bond with the structural material resulting a stronger/more durable overall structure and requiring less maintenance than compared to that typically resulting from fitting the structural material with exterior lens-supporting structures, components and/or assemblies with which to receive and focus received light upon light detectors. In some implementations, the optical-fiber-embedded structural material is impervious to erosion by rain and other environmental conditions such as sand, dirt, etc. Sixth, the described system reduces fabrication and maintenance cost due to a simplified design and fabrication standards and a reduction in the number of necessary parts. Seventh, the reduction in maintenance contributes to an increase operational readiness. Eighth, the passive detection system can in some implementations be also used in a non-passive, emitting capacity, to allow for optical communication and to mitigate and/or counter a detected light source. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 3A-3B illustrate alternative views of the described structure of FIG. 2B according to an implementation.

FIGS. 4A-4C illustrate various views of an example detection patch according to an implementation.

Like reference numbers and designations in the various drawings indicate like elements.

DETAILED DESCRIPTION

Figure 1A:
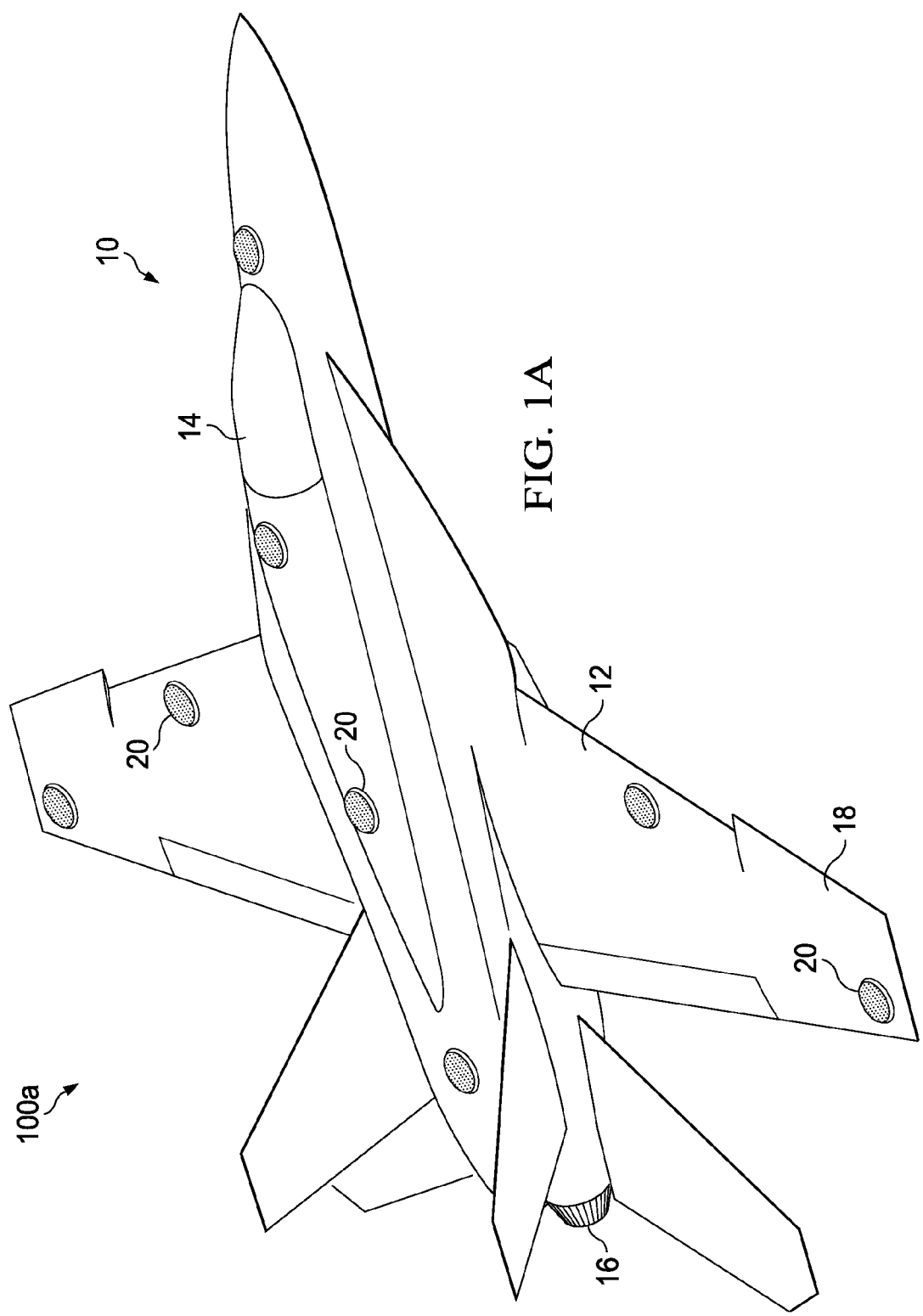
FIG. 1A provides a conceptual view of an aircraft employing a passive detector for wide-spectral-band laser emissions according to an implementation.

The following description is presented to enable any person skilled in the art to make and use the subject matter of the disclosure, and is provided in the context of one or more particular implementations and their requirements. Various modifications to the disclosed implementations may be made, and the general principles defined herein may be applied to other implementations and applications without departing from scope of the disclosure. Thus, the present disclosure is not intended to be limited only to the described and/or illustrated implementations, but is to be accorded the widest scope consistent with the principles and features disclosed herein.

In general, the present disclosure relates to methods and systems for passive detection of light from light sources. In particular, the disclosure describes a passive light source detector for sensing wide-spectral-band laser emissions on the surface(s) of structures such as aircraft, vehicles, helmets, and other objects without the need for exterior lenses and/or associated lens-supporting exterior structures, components and/or assemblies. Particular applications include the detection, indication, warning, tracking, and/or avoidance of threats using targeting lasers or other light sources for ordnance and/or projectile guidance, or the light source itself to inflict damage upon a target. Although the following description focuses primarily upon the passive detection of wide-spectral-band laser emissions, those of skill in the art will appreciate applicability of the disclosure to the passive detection of any light source, whether coherent/incoherent and/or visible/invisible.

Passive detection of light sources, and in particular incoming laser radiation over a wide frequency range and at very high dynamic power levels, poses unique challenges for personnel and objects equipped with external surface detectors. Detection system external detectors often require the use of lenses and associated external lens-supporting structures, components and/or assemblies with which to receive and focus received light from a light source upon one or more light detectors. Limitations of lenses include weight, optical clarity/transmissivity, reflectivity, and/or durability of lens materials and eventual damage to lenses over time by maintenance, cleaning, and/or abrasive environmental materials. Exterior lens-supporting structures, components, and/or assemblies can also increase the thickness of an object, reflect light, create a non-uniform surface (e.g., radar/optical reflecting), require maintenance, complicate fabrication, and/or introduce one or more structural weak points into a structure supporting a light source detector. Additionally, as multiple lens assemblies are needed to precisely calculate direction, range, and intensity of a light source, conventional light detection systems become prohibitively costly, introduce an unacceptable maintenance requirement, reduce operational readiness, and can only be used on objects with sufficient surface area to support the multiple lens assemblies.

This disclosure describes the use of optical fiber elements embedded within the exterior "skin" of an object, such as aircraft, vehicles, helmets, and other objects, to serve as optical channels as part of a passive light source detector for sensing wide-spectral-band laser emissions. At a high level, the optically conductive optical fiber material goes through outer skin of the structural material and forms a solid bond with it. For example, in some implementations, the optical fibers can be embedded within a casting of a structural material (e.g., aluminum, titanium, plastic, or other structural material) to form a "detection patch" used in place of a regular section of structural material skin for the object. In some implementations, the ends of the optical fiber embedded in the structural material can be polished together with the structural material as one piece to make a smooth and continuous surface with the ends of the polished optical fibers flush with the surface of the structural material. The many optical channels formed by the embedded optical fibers act as a conduit for optical received at the surface of the structural material to a passive light source detector system. In effect, each optical fiber becomes a light source "detector." In some implementations, exterior terminating ends of polished optical fibers embedded into a detection patch can be aimed at different angles to normal in relation to the detection patch at that location to increase detection of received optical energy. As a result optical energy can be distributed from the structural material from all desired directions and at desired intensity levels without breaking the structural material of the detection patch with the use of materials (e.g., glass, steel, plastic) with different mechanical properties.

FIG. 1A illustrates a conceptual view 100a of an aircraft employing a passive detector for wide-spectral-band laser emissions according to an implementation. As illustrated, fighter-type aircraft 10 includes a passive detector system (hereinafter "detector") 12 (not explicitly illustrated) to detect wide-spectral-band laser emissions, a cockpit windshield 14, engine exhaust 16, and various airfoil joints and surfaces 18. However, as will be noted, no external discontinuous or apparent lenses (and associated external lens-supporting structures, components and/or assemblies) are present on the aircraft 10 surface as the detector 12 requires no external lenses, coatings, and/or other surface anomalies to provide passive detection of wide-spectral-band laser emissions. As illustrated, optical-fiber-embedded detection patches 20 are illustrated as placed in various locations on the fuselage of the aircraft 10 to provide detection at multiple locations on the aircraft 10 surface. As will be appreciated by those of skill in the art, detection patches 20 can be placed at any appropriate location on the aircraft 10 and in any appropriate number suitable to the desired passive light source detection capability of the aircraft 10. For example, detection patches 20 can be place at the front, bottom, sides, and/or top of the vehicle. All optical fibers associated with a detection patch 20 will be extended inside the vehicle and terminate at the detector 12.

Figure 1B:
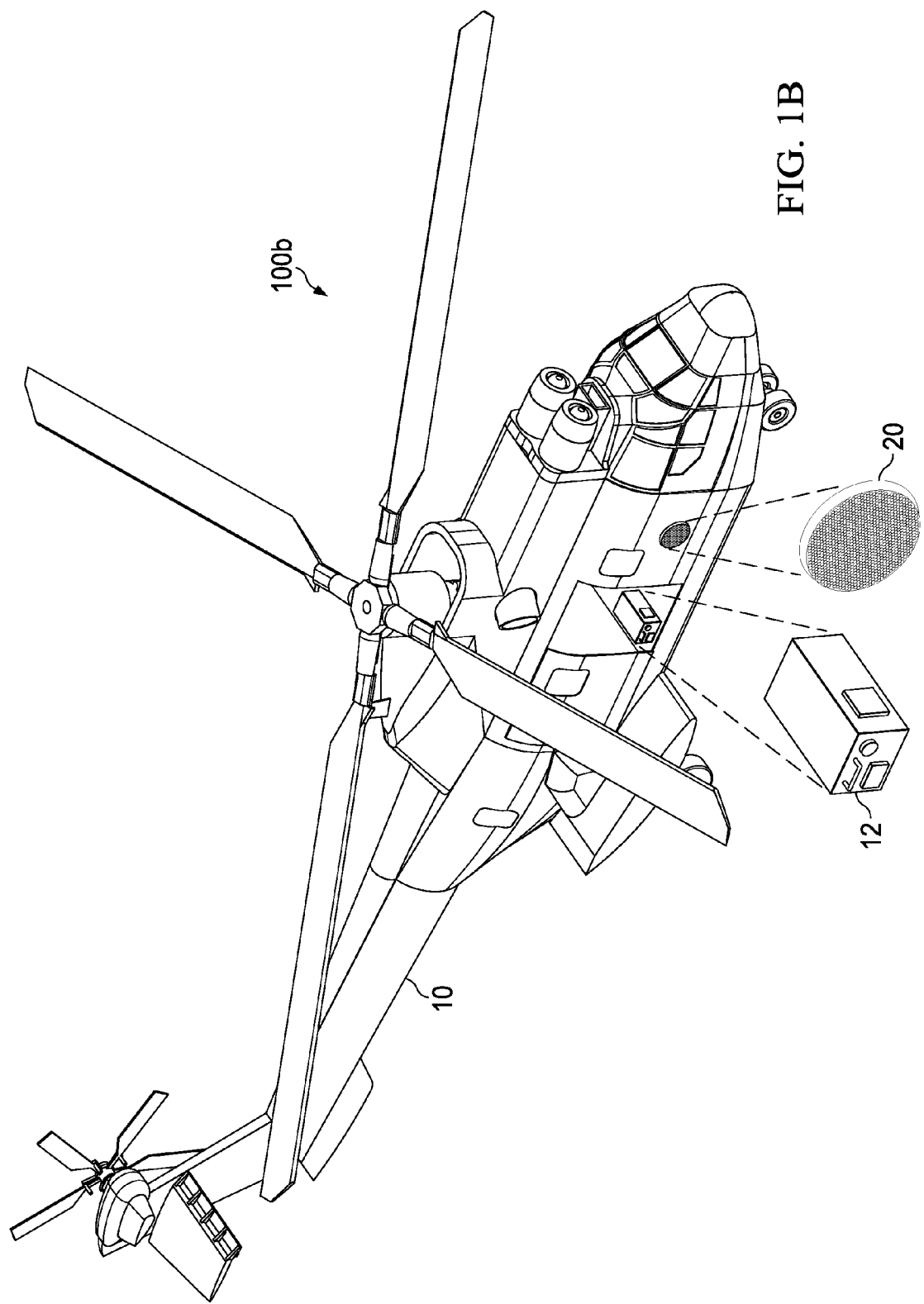
FIG. 1B provides an alternative conceptual view of an aircraft employing a passive detector for wide-spectral-band laser emissions according to an implementation.

FIG. 1B provides an alternative conceptual view 100b of an aircraft employing a passive detector for wide-spectral-band laser emissions according to an implementation. As illustrated, helicopter-type aircraft 10 includes a detector 12 (here illustrated as an example equipment module) to detect wide-spectral-band laser emissions. As in FIG. 1, no external discontinuous or apparent lenses (and associated external lens-supporting structures, components and/or assemblies) are present on the aircraft 10 surface as the detector 12 requires no external lenses, coatings, and/or other surface anomalies to provide passive detection of wide-spectral-band laser emissions. A single optical fiber embedded detection patch 20 is illustrated as placed on the forward fuselage, although, as will be appreciated by those of skill in the art, any number of detector patches 20 can be present in any appropriate location on the aircraft 10 to provide desired passive light source detection capability on the aircraft 10 surface.

Figure 2A:
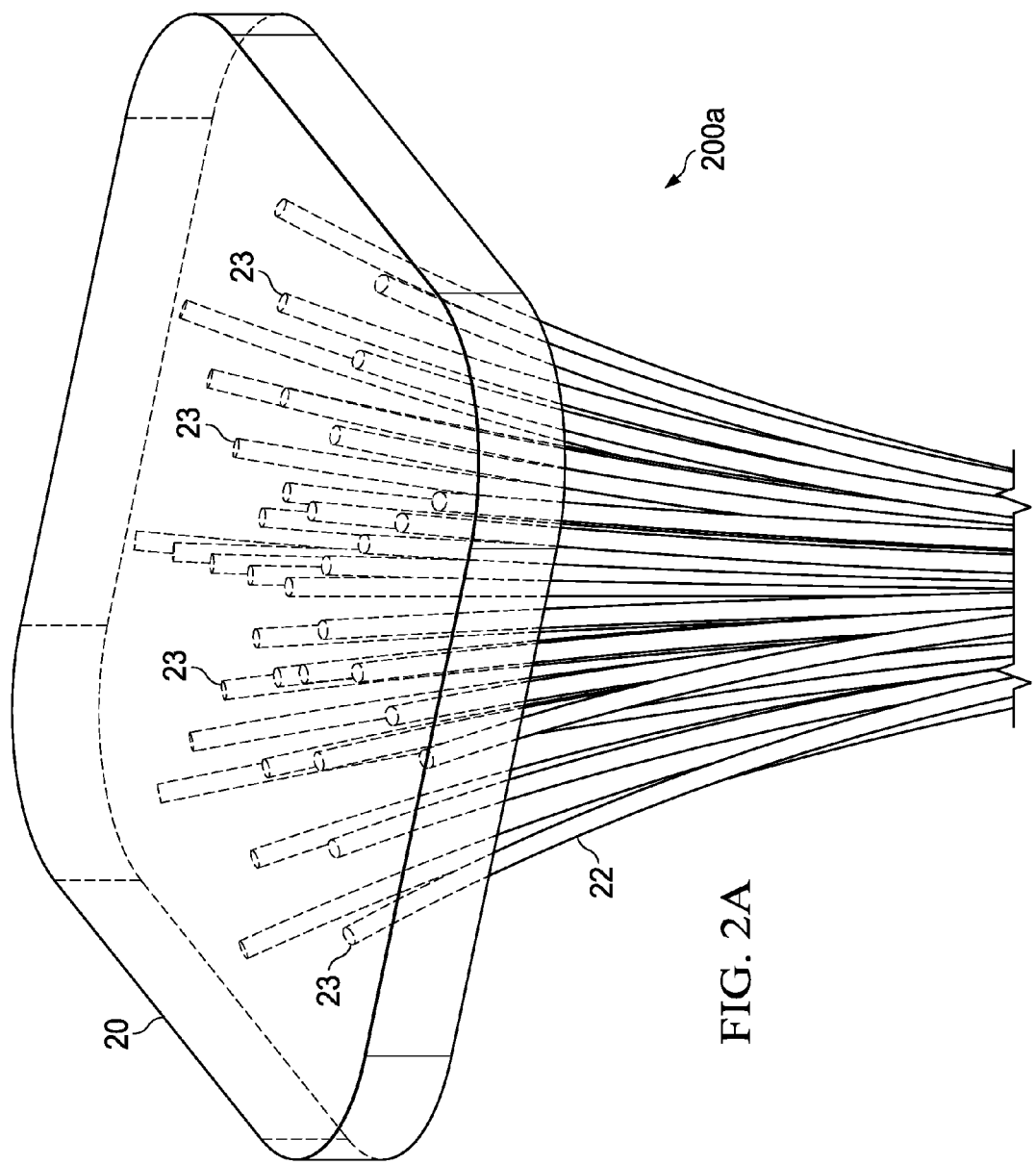
FIG. 2A illustrates a cross section of an optical-fiber-embedded structural material forming a detection patch according to an implementation.

FIG. 2A illustrates a cross section 200a of an optical-fiber-embedded structural material forming a detection patch according to an implementation. Detection patch 20 is illustrated with angularly distributed individual, optical fiber elements 22 embedded into the detection patch 20 and acting as optical channels to transmit optical energy to a detector 12 (not illustrated). The angular values are relative to normal in relation the detection patch 20. For example, in one implementation, the angular values with which the optical fiber elements 22 couple with the surface of the detection patch 20 can range from perpendicular to the surface of the detection patch 20 to various oblique angles with respect to the surface of the detection patch 20. The polished exterior terminating ends 23 of the optical fibers 22 are shown as flush with the surface of the detection patch 20. In some implementations, the exterior terminating ends 23 of the optical fibers 22 can be above and/or below the surface of the detection patch 20 depending upon the particular uses and desired detection capability of a detector for wide-spectral-band laser emissions.

An alternate implementation uses an efficient, optical fiber-type approach that results in holes formed in a rigid composite structure. Also, the purposes of the present disclosure may be achieved by receiving and passing light through small openings in a highly conductive material. Other implementations of the present disclosure may include the use of either naturally occurring openings in a conductive fabric or the space between tiny metal springs to receive and pass light through a retractable, transparent membrane.

The preferred implementation, however, uses an optical fiber/structural material composite in which arrays of optical fibers 22 pass directly through the structural material. The optical fibers 22 are arranged at selected angles relative to the outer mold line surface to provide the requisite angular coverage with minimum above-mold-line exposure.

Figure 2B:
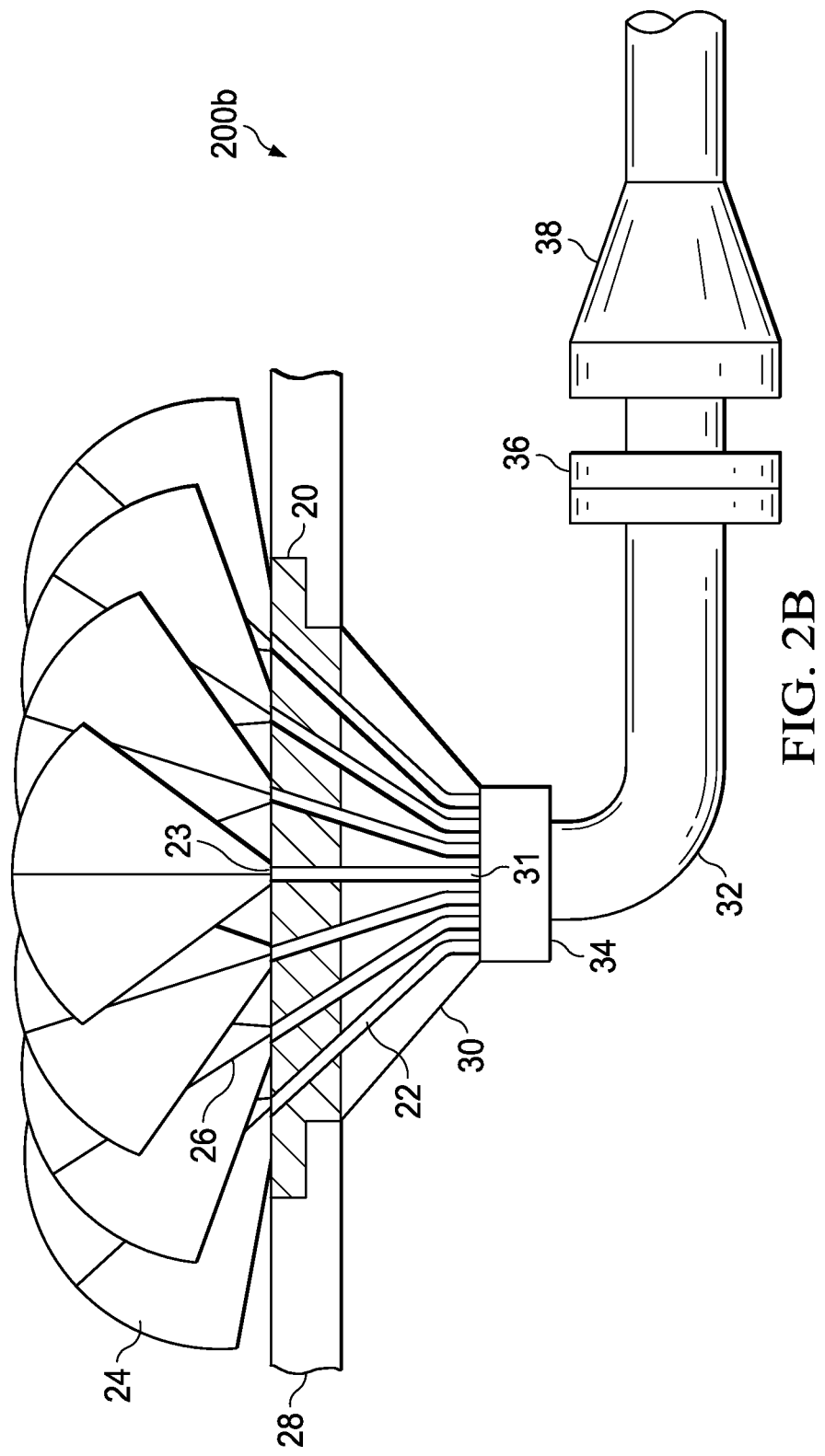
FIG. 2B illustrates a more detailed cross section of an optical-fiber-embedded structural material forming detection patch according to an implementation.

FIG. 2B illustrates a more detailed cross section 200b of an optical-fiber-embedded structural material forming a detection patch 20 according to an implementation. Passive detection of wide-spectral-band laser emissions can be performed through optical fibers 22 passing through detection patch 20. Detection patch 20 may be formed to associate flush with exterior skin 28. Optical fibers 22 may be positioned at varying angles in an epoxy (or other appropriate material) casting 30 and then embedded/passed through the structural material of the detection patch 20. The interior terminating ends 31 of the optical fibers 22 are optically connected/coupled as an optical fiber bundle with an optical fiber light pipe 32 using an optical coupler 34. Optical energy received at the exterior terminating ends 23 of the optical fibers 22 is transmitted to the optical fiber light pipe 32 through the optical coupler 34. Optical fiber light pipe 32 transmits the optical energy through optional light filters 36 such that light sensor 38 receives optionally filtered optical energy. In some implementations, light sensor 38 is separate from the detector 12 and transmits data about the received optical energy to the detector 12 using network 830. In other implementations, the light sensor 38 is part of the detector 12 which receives the transmitted optical energy.

If the detection patch 20 is embedded into an exterior skin 28 of an object, for example an aircraft 10 as illustrated in FIGS. 1A and 1B, and the aircraft 10 is irradiated (or "painted") by a directed energy weapon (DEW) beam, such as a targeting laser, the optical energy received at the surface of the detection patch 20 will couple with the exterior terminating ends 23 of each optical fiber 20 in the bundle. The energy will couple with some optical fiber 22 terminating ends 23 better than others, and specifically it will couple with a sufficient number of exterior terminating ends 23 of optical fibers 22 that are angled in such a way in order to allow a determination of exactly where the DEW is originating from. In some implementations, determination of the true vector of a DEW beam can be made to at least 1 degree of accuracy. For example, upon detection of an incoming laser, detected power levels are sampled on each of the optical fibers 22 indicating received optical energy. One particular optical fiber 22 will have a stronger optical energy signal indicating that the incoming laser more closely matches the angle of the terminating end 23 of the particular optical fiber 22. This particular optical fiber is considered the central optical fiber 22. Other nearby optical fibers 22 will also indicate an optical energy detection level, but lower than the abovementioned central optical fiber 22 due to varying terminating end angles and/or where in the area of the beam the optical fiber 22 is situated. A determination of a DEW origination vector will take into consideration all the power levels shown by individual optical fibers 22 and project a geometric center of detected power. That geometric center will correspond with an angle of incidence for the incoming laser.

Practically all the exterior terminating ends 23 will receive some incoming optical energy, but optical energy that comes at a proper angle in relation to an optical fiber 22 exterior terminating end 23 will be significantly better coupled. For example, if a DEW is projected perpendicular to the surface of a detection patch 20, exterior terminating ends 23 of optical fibers perpendicular to the surface of the detection patch 20 will better couple the incoming optical energy of the DEW than an exterior terminating end 23 of an optical fiber at an oblique angle of 45 degrees to perpendicular. It should be apparent to those of skill in the art that the incoming DEW optical energy will not directly enter the exterior terminating end 23 of an optical fiber 22 at an oblique angle whereas a perpendicular exterior terminating end 23 will allow the incoming DEW optical energy to enter the exterior terminating end 23 directly.

As described above, the detection patch 20 serves as a structural material for holding the optical fibers 22 in a defined angular distribution. The result of the defined angular distribution is a detection arc 24 where an exterior terminating end 23 of an individual optical fiber 22 receives optical energy at the surface of the detection patch 20 from directions established by the positioning of the individual optical fiber 22 within the detection patch 20. In some implementations, the detection angle 26 of the detection arc 24 can vary based on the type of optical fiber 22 (e.g., material), diameter of the optical fiber 22, termination angle (e.g., fiber is polished flat, at an angle, etc.), and/or whether the exterior terminating end 23 of the optical fiber 22 is flush with the surface of the detection patch 20. The wavelength, intensity level, and/or other appropriate parameters of the received optical energy can be determined by the light sensor 38 and/or detector 12.

Figure 3A:
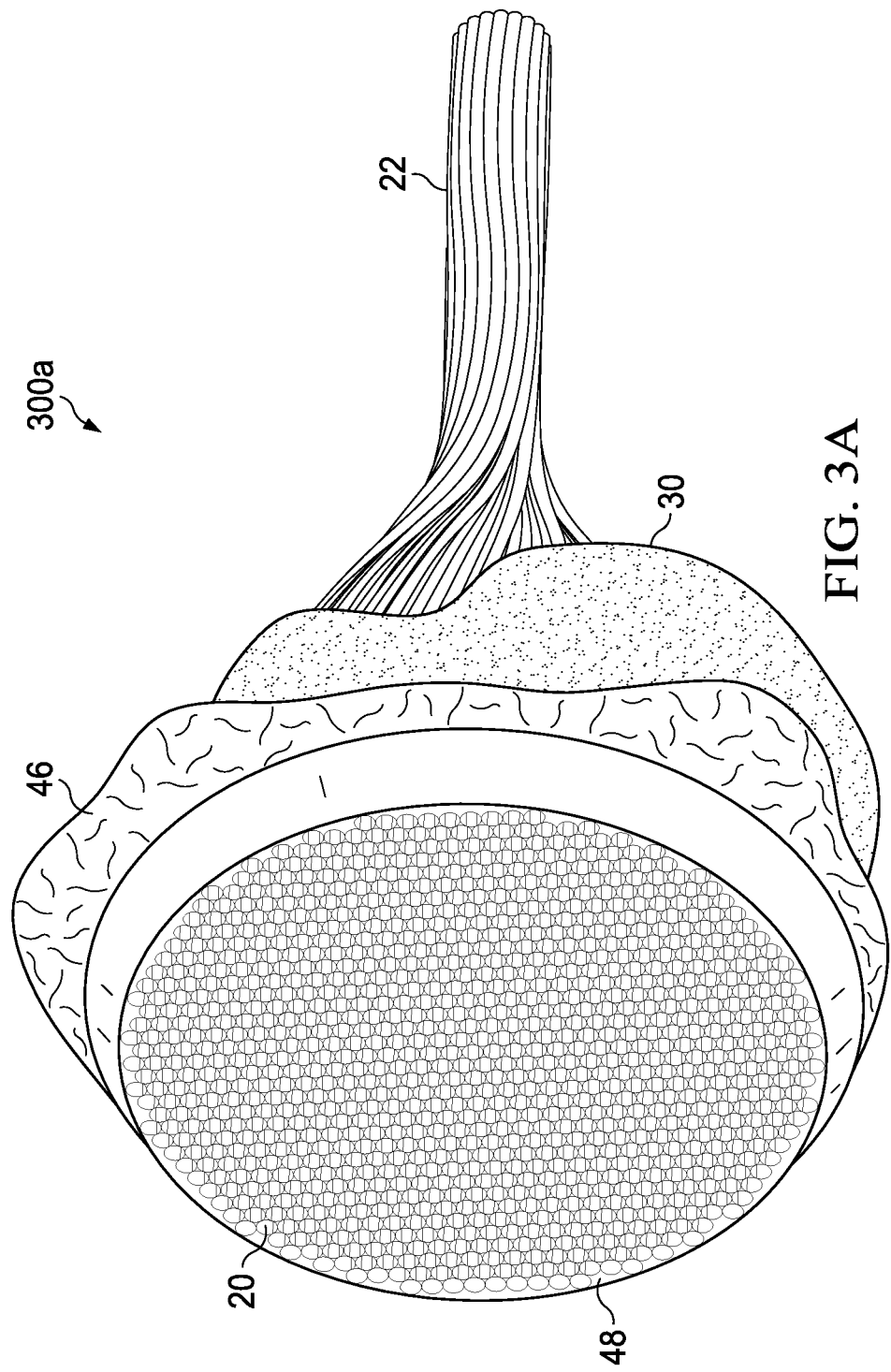

FIGS. 3A-3B illustrate alternative views 300a and 300b, respectively, of the described structure of FIG. 2B according to an implementation. Referring to FIG. 3A, optical fibers 22 are supported within epoxy (or other appropriate material) casting 30 and embedded integrally with a structural material casting 46 to form a detection patch 20. Exterior face 48 of the detection patch 20, including the exterior terminating ends 23 of optical fibers 22 passing through the structural material of the detection patch 20, is optically polished flat to allow light to freely enter the exterior terminating ends 23 of optical fibers 22. The optical fibers 22 can be cut, turned, molded, and polished by industry standard techniques. Referring to FIG. 3B, FIG. 3B is illustrated in a configuration without an epoxy (or other appropriate material) casting 30 and additional structural material surrounding the optical-fiber-embedded region of the detection patch 20. Similar to FIG. 3A, optical fibers 22 pass through the structural material of the detection patch 20 and terminate at the optically polished exterior face 48. Note in FIG. 3B that the optical fibers 22 are illustrated as twisted into a more compact bundle. In some implementations, the optical fibers 22 behind the detection patch 20 can be routed around curves, through fittings, and in any appropriate manner within the mechanical limits of the optical fibers 22.

Figure 4A:
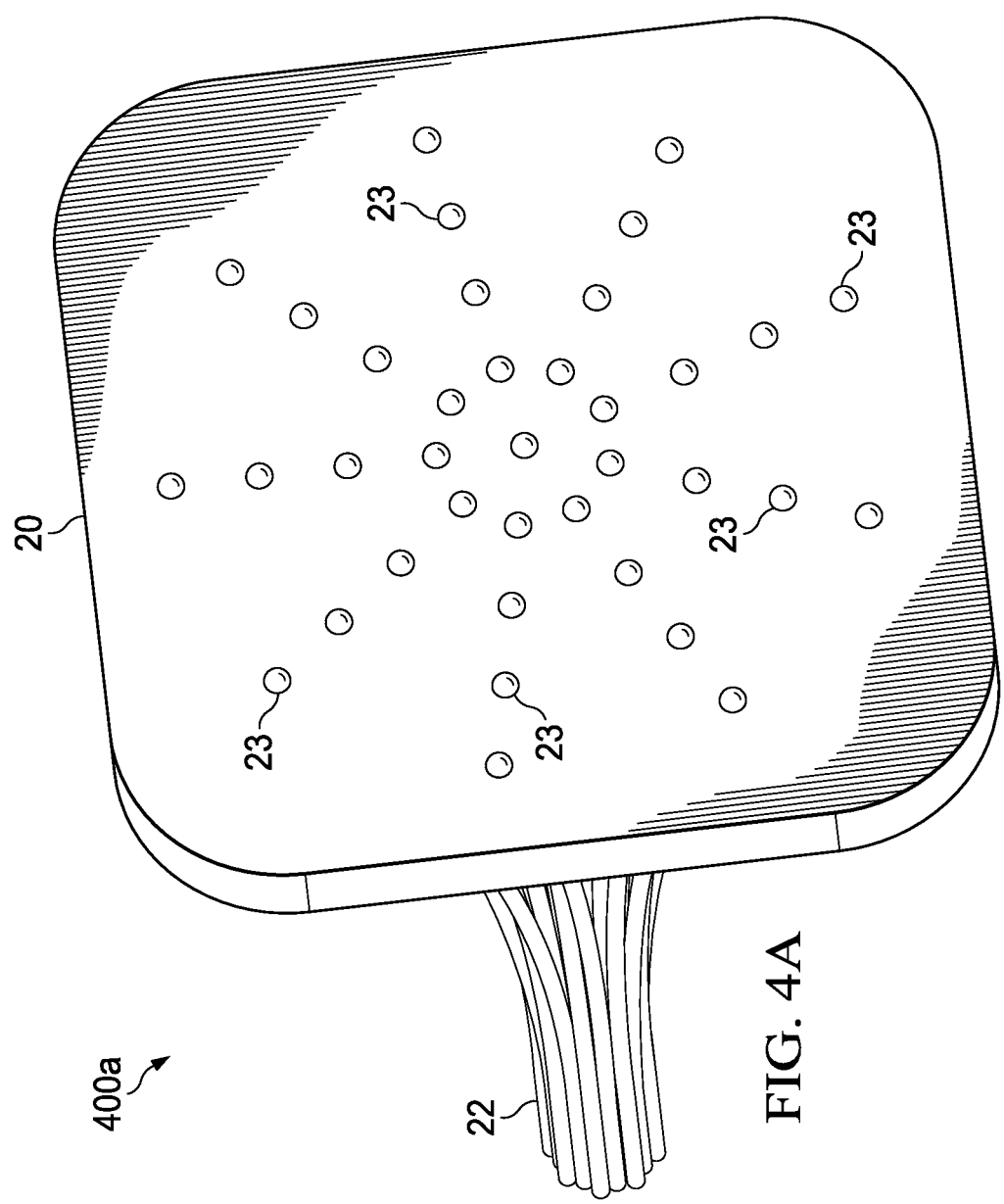
Figure 4C:
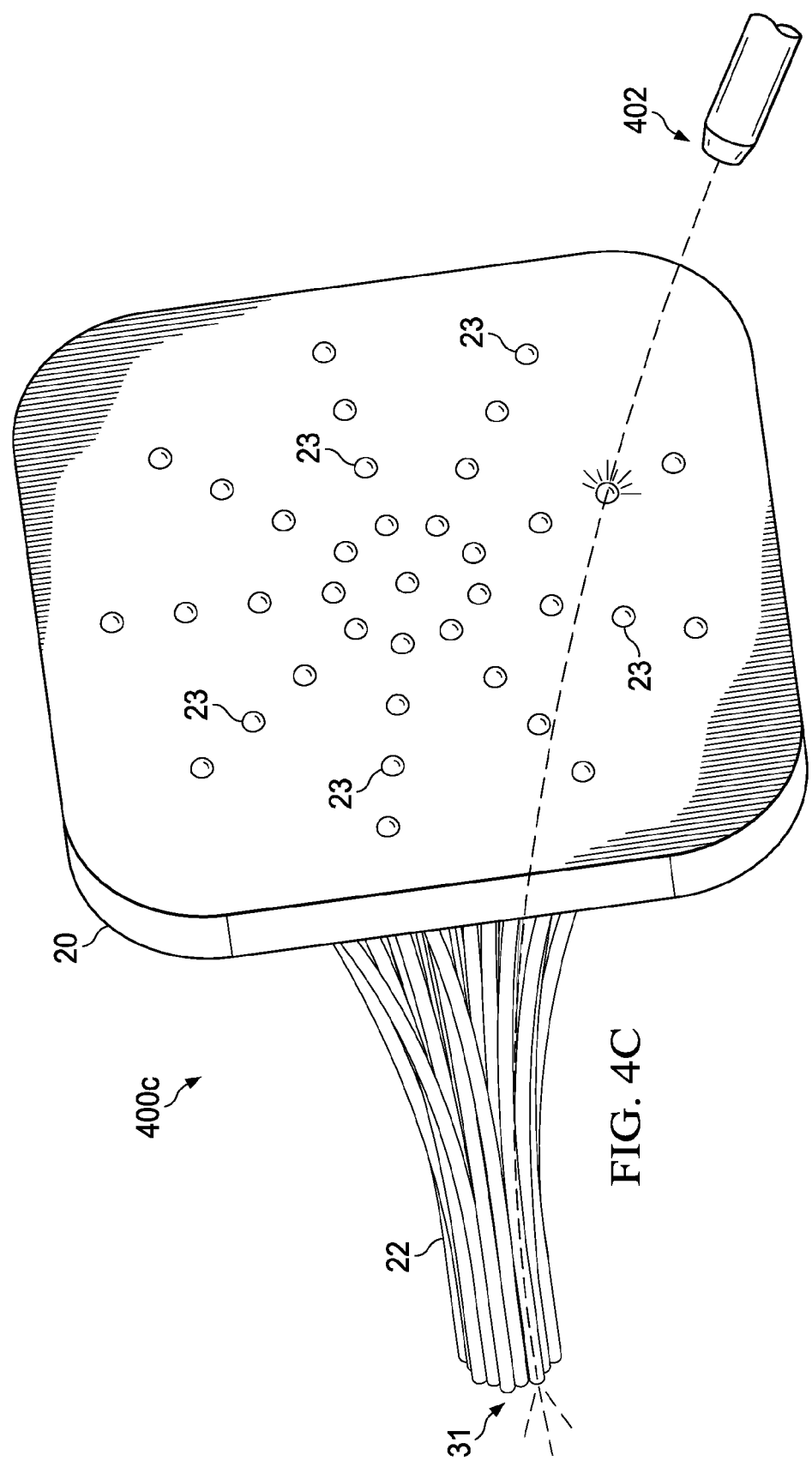

FIGS. 4A-4C illustrate various views 400a-400c, respectively, of an example detection patch 20 according to an implementation. FIGS. 4A-4C each illustrate a square detection patch 20 with multiple optical fiber exterior terminating ends arrayed in a "star" shaped pattern on the surface of the detection patch 20. FIG. 4A provides a perspective view 400a of the front of the detection patch 20 showing the pattern of the exterior terminating ends 23 of the optical fibers 22. FIG. 4B is a perspective view 400b of a bundle of optical fibers 22 embedded into the detection patch 20 at different angles to normal with respect to the front face of the detection patch 20. Here, the optical fibers 22 couple with the surface of the detection patch 20 at angles ranging from perpendicular to the oblique at 80 degrees with respect to the surface. As stated above, the angle to the oblique can vary depending upon the particular requirements of the detection patch 20. FIG. 4C is a perspective view 400c illustrating the coupling through of focused laser pointer optical energy 402 on the front face of the detection patch 20 from the exterior terminating ends 23 of the optical fibers 22 to the interior terminating ends 31 of the optical fibers 22 where the coupled optical energy can be measured by a light sensor 38, detector 12, light meter, and/or other appropriate instrument even if not visible to the human eye.

Two outstanding issues must be addressed: 1) accounting for a wide frequency range of lasers from visible (floor of approximately 500 nm) to long wave infrared (approximately 11 microns) and 2) handling an extremely wide dynamic range of sensing irradiance levels from 1 mW/cm2-2 kW/cm2.

Frequency Range

The frequency range of 500 nm-11 micron can be divided into two detector patches 20 (or sections—e.g., section A and section B). In some implementations, the two sections can be intermingled optical fibers 22 of different types. In other implementations, the two detector patches can be distinct (e.g., side-by-side, nested one inside another, etc.). For example, the higher frequency detection patch 20 can be configured as a smaller detection patch 20 surrounded on all sides by a larger lower-frequency detection patch 20.

In some implementations, section A will detect from 300 nm (even lower than 500 nm) to 4.5-5.0 microns. The use of high quality glass optical fibers, for example optical fibers with low optical loss of 3-10 dB/km and a mechanical strength of 75-100 kpsi is exemplary. As will be appreciated, optical fiber with other characteristics can also be sufficient for the purposes described in this disclosure. Total optical fiber 22 length from detector patch 20 to detector 12 on the order of 1-3 meters shows no disenables degradation in detectable optical energy. If necessary, optical signal boosters can be used to boost detection capability over longer optical fiber 22 lengths. In some implementations, optical fiber 22 made of Fluorozirconate (ZrF4) demonstrates an extremely low attenuation from 0.3-4.3 microns with extremely high tensile strength up to 100 kpsi. In another implementation, optical fiber 22 made of Fluoroindate, InF3, can detect up to 5.5 microns.

In some implementations, section B will detect from 4.0-12 microns. One implementation can use sealed waveguides for detection in this frequency range.

Dynamic Range

Irradiance levels from 1 mW/cm2-2 kW/cm2, cover a dynamic range of 2 million times. In some implementations, on average the size of optical fiber 22 is significantly smaller than a value of cm2 and will result in a receipt of an order of 1000 times less energy, since individual optical fiber 22 apertures of polished optical fibers terminating ends 23 will be around 0.001 cm2. At the detector 12, in some implementations, 1.0 microW-2.0 W energy levels maximum will be available. In some implementations, coupling into the optical fiber 22 will also produce additional losses. A solution is to divide the dynamic range into two ranges: 1) from 1.0 microW-1.0 mW and 2) from 1.0 mW-1.0 W. In some implementations, each range can have its own set of optical fibers 22 that terminate with an appropriate detector patch 20 (section) and gain system. For example, for an optical energy signal of 1.0 kW (the upper range of values), a first detector 12 with high gain would be swamped since respective sensing range is only 1.0 mW-1.0 W/cm2 (as measured outside the detection patch 20). A second detector 12 with appropriate gain amplifiers can, however, detect and calibrate the received optical energy signal. The same is true for a low-end optical energy signal, where the low-gain detector detects nothing, but a high-gain detector 12 can detect the received optical signal.

The described subject matter may be made by applying several conventional manufacturing methods, including casting (including sand casting and die casting), electroless plating, electroforming, and/or powder metal techniques. A numerical aperture of the individual optical fibers 22 determines a detection arc 24 (see FIG. 2B). Additional considerations include the expected light input per optical fiber 22 and sufficient fiber redundancy to accommodate anticipated optical fiber 22 breakage. In forming the described subject matter, a defined composite structure is formed of a structural material to which the optical fibers are inert. The structural material should have a first melting point lower than the melting point of the optical fibers 22 so the optical fibers 22 can pass through the defined composite structure without physical damage to the optical fibers 22. Exterior Terminating ends 23 of the optical fibers 22 need not be polished to high optical quality. The interior terminating ends 31 of the optical fibers 22, however, must be highly optically polished to maximize light coupling efficiency. In some implementations, each individual optical fiber 22 that meets at the optical coupler 34 has an individual signal directed in the light pipe 32 to the light sensor 38 for reading of the optical energy received by each optical fiber 22.

In some implementations, the optical fibers 22 that come from the detection patch patch 20 can be oriented and spaced into a single line. This line will go directly into the detector 12 (e.g., a spectrum analyzer) detection line. For example, each of the detector 12 detection lines can be comprised of thousands of individual optical fiber 22 detectors with a direct assignment of each optical fiber 22 to a particular pixel/detector. Because the coefficient of expansion of the structural material is likely several times higher than that of glass or silica optical fibers 22, the optical fibers 22 are tightly captured upon cooling of the structural material in which they are embedded. The optical fibers 22 do not suffer compression fracturing during cooling due to high compression strength. This eliminates rain leakage and eliminates optical fiber 22 slippage and dirt-collecting cavities in the structural material.

An alternative manufacturing method can employs electro-forming or plating of a nonmetallic structural material. For the plating approach, a non-metallic substrate, such as polymer can be used. The coefficient of expansion of the non-metallic substrate is more closely matched to the coefficient of expansion of the optical fiber 22. The optical fibers 22 are tightly adhered in the non-metallic substrate and do not leak or slip. After the non-metallic substrate is cast and the optical fibers 22 are placed, the entire outer surface of the non-metallic substrate (including its protruding optical fiber 22 stubble), and the mating edges of the non-metallic substrate are plated by conventional methods to produce a highly conductive surface. The plated exterior surface is then optically smoothed and polished. For example, if 240 micron optical fibers are spaced 11 diameters apart (i.e., 20 diameters between the hole edges), approximately 20,000 optical fibers 22 will be present in a 6"×6" square. Other sized optical fibers and spacing are also envisioned depending upon the particular requirements of the implementation.

Figure 5:
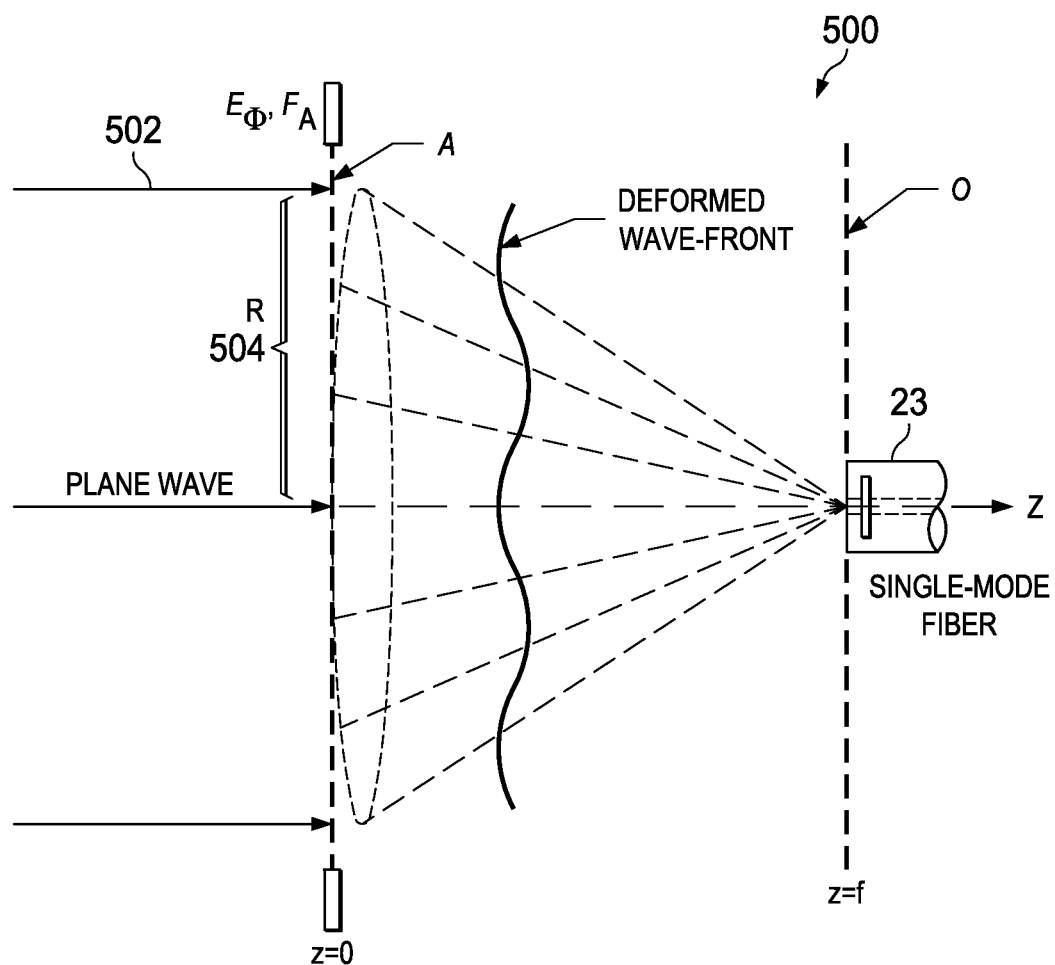
FIG. 5 is an example illustration of the relative size of an incoming laser emission in relation to a receiving optical fiber according to an implementation.

FIG. 5 is an example illustration of the relative size of an incoming laser emission in relation to a receiving optical fiber according to an implementation. Here the incoming laser emission 502 is much wider in relation to a diameter of a specific optical fiber 23. For example, the laser emission 502 has a radius 504 of R, which is much wider than the illustrated optical fiber 23. Given this discrepancy, only a portion of the incoming laser emission 502 will be funneled into the optical fiber 23 for detection and/or analysis. The remainder of the laser emission 502 can be received by other optical fibers for detection and/or analysis or is not detected.

Figure 6:
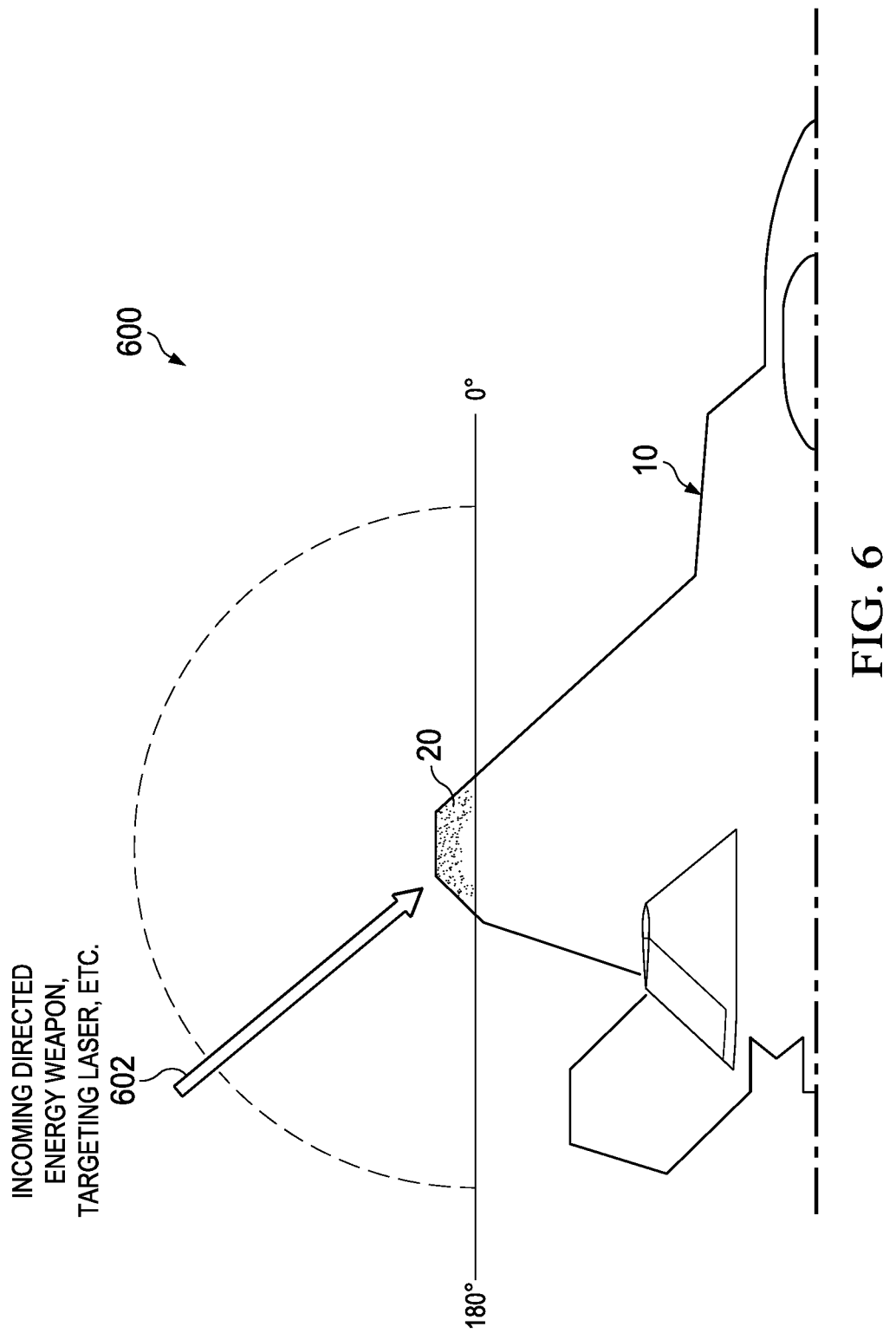
FIG. 6 illustrates an example of a detection patch configured to replace a portion of an aircraft wing tip according to an implementation.

FIG. 6 illustrates an example 600 of a detection patch 20 configured to replace a portion of an aircraft wing tip according to an implementation. The detection patch provides 180 degree detection capability for the aircraft 10 at the wingtip. A incoming DEW, targeting laser, etc. 602 can be detected and the true vector of the beam determined by using the data optical energy data provided by the optical fibers 22 associated with the detection patch 20. Although illustrated in two dimensions for clarity, it should be apparent to those of skill in the art that the detection patch 20 would also provide detection capability and vector determination both above and below the aircraft 10 as well. As illustrated in FIG. 1A, detection patches 20 can be strategically placed at multiple places on the aircraft to provide desired detection capability.

Figure 7:
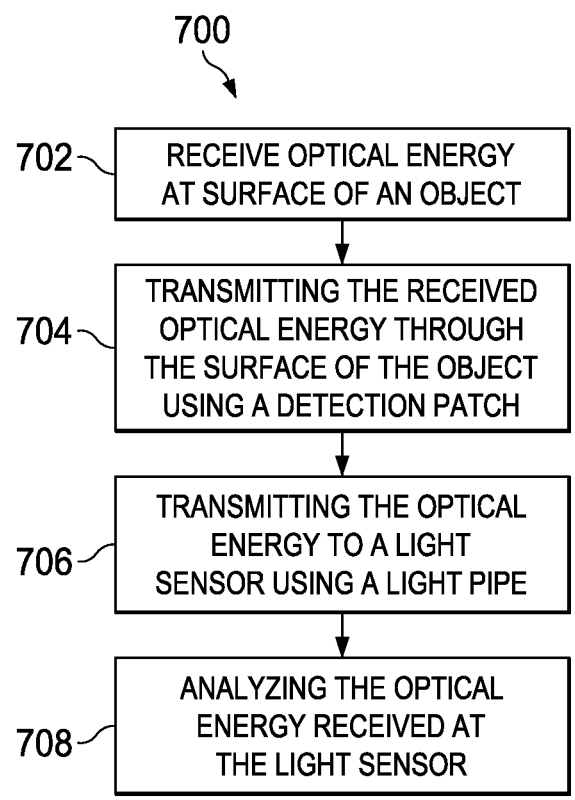
FIG. 7 is a flow chart of a method for passive detection of wide-spectral-band laser emissions according to an implementation.

FIG. 7 is a flow chart of a method 700 for passive detection of wide-spectral-band laser emissions according to an implementation. For clarity of presentation, the description that follows generally describes method 700 in the context of FIGS. 1A-1B, 2A-2B, 3A-3B, 4A-4C, 5, 6, and 8. However, it will be understood that method 700 may be performed, for example, by any other suitable system, environment, software, and hardware, or a combination of systems, environments, software, and hardware as appropriate. In some implementations, various steps of method 700 can be run in parallel, in combination, in loops, or in any order.

At 702, optical energy is received from an emission source at a surface of an object. In some implementations, a different optical energy frequency range or dynamic range can be detected using two or more sections of the detection patch, each section used to detect a different optical energy frequency range or dynamic range. In some implementations, the optical energy can be a laser, spotlight, DEW, or other optical energy. From 702, method 700 proceeds to 704.

At 704, the received optical energy is transmitted through the surface using a detection patch coupled to the surface, the detection patch incorporating an exterior terminating end of each of one or more of a plurality of optical fibers embedded in a casting. From 704, method 700 proceeds to 706.

At 706, the optical energy is transmitted to a light sensor using a light pipe coupled to interior terminating ends of the one or more optical fibers. In some implementations, the transmitted optical energy received from the light pipe is filtered before receipt by the light sensor. From 706, method 700 proceeds to 708.

At 708, the optical energy received at the light sensor is analyzed by operation of a computer. In some implementations, the analysis is performed by a detector using light sensor data received from the light sensor. In some implementations, a true vector of the emission source in relation to the detection patch is calculated using optical energy analysis data. In some implementations, an action responsive to the received optical energy is initiated. From 708, method 700 stops.

Figure 8:
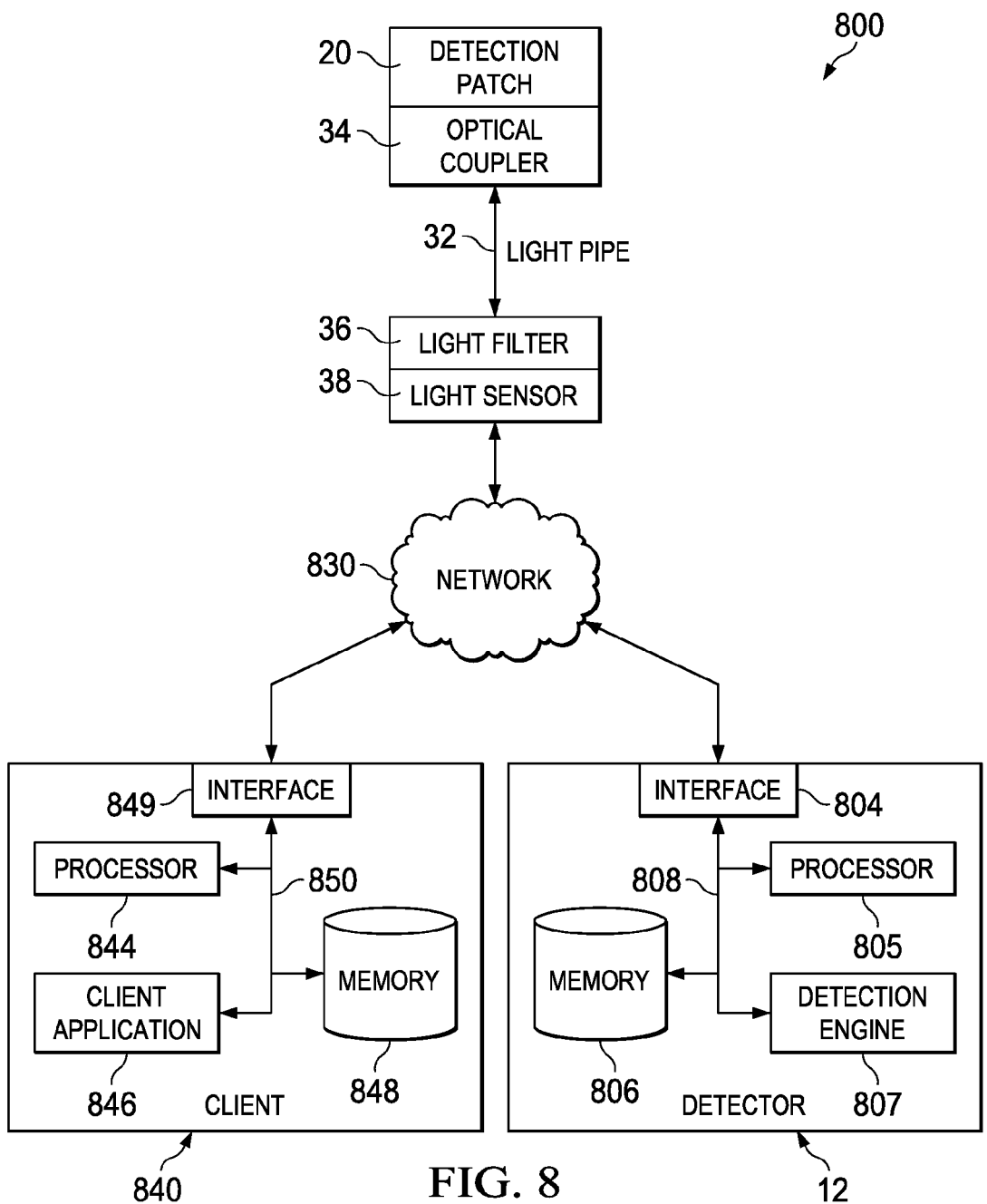
FIG. 8 is a block diagram of an example detection system for passive detection of wide-spectral-band laser emissions according to an implementation.

FIG. 8 is a block diagram of an example detection system 800 for passive detection of wide-spectral-band laser emissions according to an implementation. The detection system 800 includes a detector 12, one or more detection patches 20, a network 830, and a client 840. Other configurations within the scope of this disclosure are also envisioned.

Passive detection of wide-spectral-band laser emissions can be performed through optical fibers 22 (not illustrated) passing through detection patch 20. Optical fibers 22 may be positioned at varying angles in an epoxy (or other appropriate material) casting 30 (not illustrated) and then embedded/passed through the structural material of the detection patch 20. The interior terminating ends 31 (not illustrated) of the optical fibers 22 are optically connected/coupled as an optical fiber bundle with an optical fiber light pipe 32 using an optical coupler 34. Optical energy received at the exterior terminating ends 23 of the optical fibers 22 is transmitted to the optical fiber light pipe 32 through the optical coupler 34. Optical fiber light pipe 32 transmits the optical energy through optional light filters 36 such that the light sensor 38 receives optionally filtered optical energy. In some implementations (e.g., as illustrated), the optical coupler 34, light pipe 32, light filter 36, and light sensor 38 are separate from the detector 12 and transmit data about the received optical energy to the detector 12 using network 830 and the interface 804. In other implementations, one or more of the optical coupler 34, light pipe 32, light filter 36, and light sensor 38 are part of the detector 12 which receive optical energy from the detection patch 20/optical fibers 22 directly.

The detector 12 is any computer-based system that provides functionality to perform, among other things, optical energy measurements, analysis of the optical energy measurements, and to perform actions responsive to the optical energy measurement analysis. As stated above, the detector 12 is responsible for performing optical energy measurements of optical energy received by the optical fibers 22. In some implementations, the optical fibers 22 can be terminated in a line (i.e. collected into a single line according to a defined pattern and coupled with a light sensor 38. For example, for 100 different optical fibers 22 in a 10"×10" grid covering lower frequencies and a similar array covering higher frequencies, the resulting 100 optical fiber 22 bundle for each range can be spread against a 100 element (or more) light sensor 38 measuring the optical energy coming in for each optical fiber 22 and allowing a geometry/intensity/etc. computation of the incoming optical energy beam to be performed. In an implementation where some functionality of the detector 12 can be partially represented by a standard bench spectrum analyzer instrument, the light sensor can be coupled to detector 12 (i.e., the spectrum analyzer).

In some implementations, one or more of the optical coupler 34, light pipe 32, light filter 36, and/or light sensor 38 can be incorporated into the detector 12. For example, the illustrated detection patch 20 can be configured in to the skin of an object, such as an aircraft, optical fibers 22 can be run through the fuselage of the aircraft to a detector 12 where the optical fiber 22 bundle can be coupled to an optical coupler 34 integral to the detector 12. In these implementations, data from light sensor 38 can be transmitted to the memory 806, detection engine 807, etc. using a system bus 808.

The detector 12 includes an interface 804. Although illustrated as a single interface 804 in FIG. 1, two or more interfaces 804 may be used according to particular needs, desires, or particular implementations of the detection system 800. The interface 804 is used by the detector 12 for communicating with other systems in a distributed environment, for example, the light sensor 38 and/or client 840 as well as other systems communicably coupled to the network 830 (whether illustrated or not). Generally, the interface 804 comprises logic encoded in software and/or hardware in a suitable combination and operable to communicate with the network 830. More specifically, the interface 804 may comprise software supporting one or more communication protocols associated with communications such that the network 830 or interface's hardware is operable to communicate physical signals within and outside of the illustrated detection system 800.

The detector 12 includes a processor 805. Although illustrated as a single processor 805 in FIG. 8, two or more processors may be used according to particular needs, desires, or particular implementations of the detection system 800. Generally, the processor 805 executes instructions and manipulates data to perform the operations of the detector 12. Specifically, the processor 805 executes the functionality required to perform, among other things, optical energy measurements, analysis of the optical energy measurements, and to perform actions responsive to the optical energy measurement analysis.

The detector 12 also includes a memory 806 that holds data for the detector 12. Although illustrated as a single memory 806 in FIG. 8, two or more memories may be used according to particular needs, desires, or particular implementations of the detection system 800. While memory 806 is illustrated as an integral component of the detector 12, in alternative implementations, memory 806 can be external to the detector 12 and/or the detection system 800.

The detection engine 807 performs, among other things, optical energy measurements, analysis of the optical energy measurements, and to perform actions responsive to the optical energy measurement analysis. In some implementations, the detection engine can provide data and/or GUI interfaces for the benefit of a user of the client 840 (e.g., allows the client 840 to request, view, execute, create, edit, delete, and/or consume content from the detector 12). In some implementations, the interface, 804, processor 805, memory 806, and/or detection engine 807 communicate using a system bus 808.

The client 140 may be any computing device operable to connect to or communicate with the detector 12 using the network 830. In general, the client 840 comprises an electronic computing device operable to receive, transmit, process, and store any appropriate data associated with the detection system 800. More particularly, among other things, the client 840 can be used to program the detector 12, analyze stored detector 12 data, and the like. The client typically includes a processor 844, a client application 846, a memory 848, and/or an interface 849.

The client application 846 is any type of application that allows the client 140 to navigate to/from, request, view, create, edit, delete, administer, and/or manipulate content associated with the detector 12. In some implementations, the client application 846 can be used to program the detector 12, analyze stored detector data 12, and the like. Although illustrated as a single client application 846, the client application 846 may be implemented as multiple client applications in the client 840.

The interface 849 is used by the client 840 for communicating with other computing systems in a distributed computing system environment, including within the detection system 800, using network 830. For example, the client 840 uses the interface to communicate with the detector 830 as well as other systems (not illustrated) that can be communicably coupled to the network 830. The interface 849 may be consistent with the above-described interface 804 of the detector 12 or other interfaces within the detection system 800. The processor 844 may be consistent with the above-described processor 805 of the detector 12 or other processors within the detection system 800. Specifically, the processor 844 executes instructions and manipulates data to perform the operations of the client 840, including the functionality required to send requests to the detector 12 and to receive and process responses from the detector 12. The memory 848 typically stores objects and/or data associated with the purposes of the client 840 but may also be consistent with the above-described memory 806 of the detector 12 or other memories within the detection system 800 and be used to store data similar to that stored in the other memories of the detector 12 for purposes such as backup, caching, and the like. In some implementations, the interface, 849, processor 844, client application 846 and/or memory 848 communicate using a system bus 850.

There may be any number of clients 840 associated with, or external to, the detection system 800. Further, the term "client" and "user" may be used interchangeably as appropriate without departing from the scope of this disclosure.

The illustrated client 840 is intended to encompass any computing device such as a desktop computer, laptop/notebook computer, wireless data port, smart phone, personal data assistant (PDA), tablet computing device, one or more processors within these devices, or any other suitable processing device. For example, the client 840 may comprise a computer that includes an input device, such as a keypad, touch screen, or other device that can accept user information, and an output device that conveys information associated with the operation of the detector 12 or the client 840 itself, including digital data, visual and/or audio information, or a GUI.

While the above-described subject matter pertains to the use of the described system in a detection capability, in some implementations, the described system can be used to also emit optical energy. For example, the described detector patch 12 can also provide optical energy emission capability with optical energy transmitted through the optical fibers 22 to the exterior terminating ends 23. Those of skill in the art will understand particular modifications necessary to provide light emission capability in addition to the described detection functionality. For example, an additional emitter box can be added to the describe system or the detector 12 can be configured with functionality to provide both optical energy detection/emission capability (and associated functionality). In some implementations, the system can both detect and emit optical energy simultaneously. In some implementations, the detection of particular optical energy can trigger an automatic light emission response.

It should also be noted that the above-described system can be designed to detect/emit various frequencies of optical energy, whether visible or invisible. Depending upon a particular use, invisible light may be chosen for security or other appropriate purposes. The above described subject matter is applicable to any appropriate object, including vehicles (both ground, air, and water-based).

A possible application of the described subject matter could include an application coupled to an infantry helmet and/or uniform to allow a soldier to not only detect laser pointers, designators, and DEWs, but the position of the sun (or other reference light source such as military base lighting, etc.) to provide directional awareness/navigation data (e.g., indicate true North on a helmet mounted eyepiece, handheld unit, etc.) when coupled with an inertial measurement unit (IMU) global positioning system (GPS), and/or other appropriate instrument(s). In other implementations, individual soldiers, vehicles, objects, buildings, etc. can transmit identification light pulses that can be detected by other soldiers, vehicles, objects, buildings, etc. to provide constant situational awareness of positions. In some implementation, situational data can be transmitted to a commander or a base position for analysis.

Another possible implementation could include an application to detect the lasing of vehicle/building window/walls with lasers for clandestine eavesdropping. The described system could detect such activity and notify appropriate personnel and/or trigger appropriate countermeasures (e.g., vibration of windows, notification of law enforcement, and/or termination of conversations).

Another possible implementation could include an application to provide an optical identification friend-foe (IFF) capability. For example, an aircraft could pulse a battlefield with a particular frequency of light and friendly vehicles/soldiers could respond with a returned light pulse that could be detected to identify particular vehicles/soldiers. This application is also applicable to identifying aircraft. In some implementations, each soldier, vehicle, and/or object can respond with a unique frequency of light to identify the particular soldier, vehicle, and/or object.

Another possible implementation could include an application whereby law enforcement can emit a pulse of light to shut down fleeing vehicles. For example, every vehicle could be equipped with one or more detector patches that when the light is detected can stop a vehicle engine, govern a vehicles speed, etc.

Another possible implementation could include an application to transfer power. For example, a detector could detect a laser and then present a solar panel. The solar panel could then be illuminated by the laser to provide power for operation, charging, etc.

Another possible implementation could include an application to track laser pointers maliciously fired at aircraft cockpits and to provide countermeasures. For example, the direction, intensity, type, and location of a fired laser pointer can be determined and data transmitted instantly to law enforcement. In addition, an onboard system could provide polarization of a cockpit window to protect a pilot's eyes, warn pilots to direct their vision elsewhere or to don protective eyewear, etc.

Another possible implementation could include an application to provide an automatic landing system for an aircraft in fog, smoke, or other atmospheric condition making a visible landing impossible. For example, ground lights can be designed to emit frequencies of light capable of penetrating various environmental conditions. Detectors on an aircraft can detect the emitted light even with invisible to human eyes, and automatically guide the aircraft to a landing or to provide data to a pilot for landing purposes.

Another possible implementation could include an application to provide auto-aircraft righting in adverse atmospheric conditions. Pilots are often told to depend on their instruments, but sometimes become confused and disoriented in fog, clouds, smoke, etc. An application could provide automatic righting of an aircraft based on a detected position of the sun or moon even if the light is not detectible by human eyes or diffused by the atmospheric condition to make an accurate determination of the position of the sun or moon.

Another possible implementation could include an application to provide automated aircraft formation control. For example, aircraft could gauge their position, angle, distance, etc. relative to each other with received/transmitted pulses of light and use this information to keep very tight (beyond normal human tolerance) flight formation on a mission to a target. The tight formation could be used to confuse enemy radar/detection and provide a surprise attack capability.

Another possible implementation could include an application to provide automatic aircraft refueling. For example, both the aircraft to be refueled, the refueling aircraft, and the refueling boom can be fit with detection patches to detect pulses of light used to determined positions, guide the refueling boom, etc.

Another possible implementation could include an application to disable firearm mechanisms. For example, law enforcement could pulse a particular frequency of light toward a potential threat. A firearm could be fit with detection patches and appropriate integrated detection systems that can disable the firing mechanism if the particular frequency of light is detected.

Another possible implementation could include an application to provide optical countermeasures to a detected optical threat. For example, upon detection of an optical threat such as a laser designator, the system could trigger a counter emission of light designed to confuse the designator emitter, cancel the received optical wavelength, etc.

Another possible implementation could include a detection patch 20 configured as part of a moveable structure (e.g., an aircraft or ship surface) that changes position responsive to receiving optical energy to provide better detection capability. For example, the structure could move to obtain different data sets in order to determine more accurately a true vector to an emission source in relation to the detection patch. 20.

Various implementations of the subject matter and the functional operations described in this specification can be partially implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU, including single-thread or multi-threaded CPUs. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto.

Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using a system-type bus, application programming interface (API), and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. Accordingly, the above description of example implementations does not define or constrain this disclosure. Other changes, substitutions, and alterations are also possible without departing from the spirit and scope of this disclosure.

What is claimed is:

1. A system for passive detection of optical energy threats comprising:
a detector used to analyze optical energy received from an emission source on a surface of an object;
a plurality of optical fibers optically coupled to and used to carry optical energy to the detector;
a detection patch coupled to the surface of the object and used to transmit the optical energy through the surface of the object to the detector, the detection patch incorporating an exterior terminating end of each of the plurality of optical fibers integrally embedded within structural material comprising the detection patch; and
an outer surface of the detection patch, wherein the exterior terminating ends are distributed across the outer surface, and wherein each exterior terminating end interfaces with the outer surface of the detection patch with a particular selected interface angle varying from normal to oblique in relation to the outer surface of the detection patch to permit determination of an angle of incidence for the received optical energy by analyzing received optical energy strength for each particular exterior terminating end and determining a central exterior terminating end of the exterior terminating ends based on a strongest received optical energy strength in relation to an exterior terminating end angle of interface in relation to the outer surface.

2. The system of claim 1, further comprising:
a memory configured to store optical energy analysis data; and
a processor interoperably coupled to the memory and configured to calculate, using the optical energy analysis data, a true vector of the emission source in relation to the detection patch.

3. The system of claim 2, wherein the processor is configured to initiate an action responsive to the received optical energy.

4. The system of claim 1, wherein the detection patch comprises an optical coupler to couple interior terminating ends of the plurality of optical fibers to a light pipe for transmission of the optical energy to a light sensor.

5. The system of claim 1, wherein the detection patch is split into two or more sections, each section used to detect a different optical energy frequency range or dynamic irradiance power level range.

6. The system of claim 5, wherein the two or more sections are configured as intermingled optical fibers of different types.

7. The system of claim 5, wherein the two or more sections are distinct from each other.

8. The system of claim 1, wherein each exterior terminating end is optically polished.

9. The system of claim 8, wherein each exterior terminating end is optically polished to be flush with respect to the outer surface.

10. A system for passive detection of optical energy threats comprising:
an object that receives at a surface optical energy from an emission source;
a detection patch coupled to the surface incorporating an exterior terminating end of each of a plurality of optical fibers integrally embedded within structural material comprising the detection patch, wherein the detection patch is used to transmit the optical energy through the surface of the object, wherein the exterior terminating ends are distributed across and interfacing with the outer surface of the detection patch, and wherein each exterior terminating end interfaces with the outer surface of the detection patch with a particular selected interface angle varying from normal to oblique in relation to the outer surface of the detection patch;
an optical coupler used to couple interior terminating ends of the plurality of optical fibers to a light pipe for transmission of the optical energy to a light sensor to determine an angle of incidence for the received optical energy by analyzing received optical energy strength for each particular exterior terminating end and determining a central exterior terminating end of the exterior terminating ends based on a strongest received optical energy strength in relation to an exterior terminating end angle of interface in relation to the outer surface of the detection patch; and
a detector used to analyze the optical energy received at the light sensor.

11. The system of claim 10, further comprising:
a memory configured to hold optical energy analysis data; and
a processor interoperably coupled to the memory and configured to calculate a geometric center of received optical energy in relation to the detection patch.

12. The system of claim 11, wherein the process or is configured to initiate an action responsive to the received optical energy.

13. The system of claim 10, wherein the detection patch is split into two or more sections, each section used to detect a different optical energy frequency range or dynamic irradiance power level range.

14. The system of claim 10, wherein each exterior terminating end is optically polished.

15. The system of claim 14, wherein each exterior terminating end is optically polished to be flush with respect to the outer surface.

16. A method for passive detection of optical energy threats comprising:
receiving optical energy from an emission source at a surface of an object;
transmitting the received optical energy through the surface using a detection patch coupled to the surface, wherein the detection patch incorporates an exterior terminating end of each of a plurality of optical fibers integrally embedded within structural material comprising the detection patch, and wherein the exterior terminating ends are distributed across and interfacing with the outer surface of the detection patch, and wherein each exterior terminating end interfaces with the outer surface of the detection patch with a particular selected interface angle varying from normal to oblique in relation to the outer surface of the detection patch;
transmitting the optical energy from one or more optical fibers of the plurality of optical fibers to a light sensor using a light pipe coupled to interior terminating ends of the one or more optical fibers; and
analyzing, by operation of a computer, the optical energy received at the light sensor to determine an angle of incidence for the received optical energy by analyzing received optical energy strength for each particular exterior terminating end and determining a central exterior terminating end of the exterior terminating ends based on a strongest received optical energy strength in relation to an exterior terminating end angle of interface in relation to the outer surface of the detection patch.

17. The method of claim 16, wherein the analysis is performed by a detector using light sensor data received from the light sensor.

18. The method of claim 16, further comprising calculating, using optical energy analysis data, a geometric center of received optical energy in relation to the detection patch.

19. The method of claim 16, further comprising initiating an action responsive to the received optical energy.

20. The method of claim 16, further comprising filtering transmitted optical energy received from the light pipe before receipt by the light sensor.

21. The method of claim 16, further comprising detecting a different optical energy frequency range and dynamic irradiance power level range, using two or more sections of the detection patch, each section used to detect a different optical energy frequency range or dynamic irradiance power level range.

22. The method of claim 16, further comprising optically polishing each exterior terminating end.

23. The method of claim 22, wherein each exterior terminating end is optically polished to be flush with respect to the outer surface.

* * * * *

UNITED STATES PATENT AND TRADEMARK OFFICE
CERTIFICATE OF CORRECTION

PATENT NO. : 9,970,811 B2  
APPLICATION NO. : 14/015620  
DATED : May 15, 2018  
INVENTOR(S) : Leo Volfson Page 1 of 1

It is certified that error appears in the above-identified patent and that said Letters Patent is hereby corrected as shown below:

In the Claims

Column 19, Line 50, Claim 7, after "distinct" delete "from each other".

Column 20, Line 25, Claim 12, delete "process or" and insert -- processor --, therefor.

Signed and Sealed this  
Thirty-first Day of December, 2019

Andrei Iancu  
*Director of the United States Patent and Trademark Office*